US012794803B2

(12) United States Patent
Baj et al.

(10) Patent No.: US 12,794,803 B2
(45) Date of Patent: Nov. 10, 2026

(54) NETWORK DEVICE WITH SMOOTH FAILOVER OF SESSIONS

(71) Applicant: Juniper Networks, Inc., Sunnyvale, CA (US)

(72) Inventors: Michael Baj, Bedford, MA (US); Anna Yungelson, Boxborough, MA (US); Scott A. McCulley, Bedford, MA (US); Abilash Menon, Boxborough, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 86 days.

(21) Appl. No.: 18/933,671

(22) Filed: Oct. 31, 2024

(65) Prior Publication Data

US 2026/0121973 A1 Apr. 30, 2026

(51) Int. Cl.
*H04L 45/00* (2022.01)
*H04L 45/12* (2022.01)
*H04L 45/302* (2022.01)

(52) U.S. Cl.
CPC .......... *H04L 45/302* (2013.01); *H04L 45/123* (2013.01); *H04L 45/22* (2013.01); *H04L 45/38* (2013.01)

(58) Field of Classification Search
CPC ..... H04L 45/302; H04L 45/123; H04L 45/22; H04L 45/28; H04L 45/24; H04L 43/0882; H04L 47/125
See application file for complete search history.

(56) References Cited

U.S. PATENT DOCUMENTS

| | | | | |
|---|---|---|---|---|
| 8,369,353 | B1 * | 2/2013 | Habib | H04W 28/02 370/464 |
| 9,729,439 | B2 | 8/2017 | MeLampy et al. | |
| 9,729,682 | B2 | 8/2017 | Kumar et al. | |
| 9,762,485 | B2 | 9/2017 | Kaplan et al. | |
| 9,762,495 | B1 * | 9/2017 | Chen | H04L 45/24 |
| 9,871,748 | B2 | 1/2018 | Gosselin et al. | |
| 9,985,883 | B2 | 5/2018 | MeLampy et al. | |

(Continued)

OTHER PUBLICATIONS

Extended European Search Report, EP App. No. 25205918.3, Feb. 17, 2026, 11 pages.

(Continued)

*Primary Examiner* — Chris Parry
*Assistant Examiner* — Jonathan Estrada
(74) *Attorney, Agent, or Firm* — SHUMAKER & SIEFFERT P.A.

(57) ABSTRACT

Techniques are disclosed for a network device that performs gradual failover of sessions from a first link to a second link. For example, a network device forwards network traffic of a plurality of sessions over the first link. The network device determines that a performance of the first link does not satisfy a performance requirement. Based on the determination, the network device forwards network traffic of a first portion of the plurality of sessions over a second link and not the first link. The network device determines that a performance of the second link satisfies the performance requirement while carrying the network traffic of the first portion. Based on the determination, the network device forwards network traffic of a second, larger portion of the plurality of sessions over the second link and not the first link.

14 Claims, 3 Drawing Sheets

(56) References Cited

U.S. PATENT DOCUMENTS

| | | | | |
|---|---|---|---|---|
| 10,200,264 | B2 | 2/2019 | Menon et al. | |
| 10,257,061 | B2 | 4/2019 | Menon et al. | |
| 10,277,506 | B2 | 4/2019 | Timmons et al. | |
| 10,425,511 | B2 | 9/2019 | McCulley et al. | |
| 10,432,519 | B2 | 10/2019 | Baj et al. | |
| 10,432,522 | B2 | 10/2019 | Kaplan et al. | |
| 10,841,206 | B2 | 11/2020 | Menon et al. | |
| 11,165,863 | B1 | 11/2021 | Timmons et al. | |
| 11,463,365 | B1 * | 10/2022 | Vasseur | H04L 47/122 |
| 2020/0021358 | A1 * | 1/2020 | Maccaglia | G06N 20/00 |
| 2020/0366589 | A1 | 11/2020 | Kaplan et al. | |
| 2020/0366590 | A1 | 11/2020 | Kaplan et al. | |
| 2020/0366598 | A1 | 11/2020 | Kaplan et al. | |
| 2020/0366599 | A1 | 11/2020 | Kaplan et al. | |
| 2020/0403890 | A1 | 12/2020 | McCulley et al. | |
| 2021/0036953 | A1 | 2/2021 | Menon et al. | |
| 2022/0200887 | A1 * | 6/2022 | Menon | H04L 45/04 |
| 2022/0200915 | A1 | 6/2022 | Timmons | |
| 2022/0321443 | A1 * | 10/2022 | Bajaj | H04L 1/08 |
| 2023/0116163 | A1 | 4/2023 | Scholz et al. | |
| 2024/0284301 | A1 * | 8/2024 | Elsherif | H04W 48/16 |

OTHER PUBLICATIONS

Gopal et al., "Selective Load Redistribution in Packet-Switched Networks", IEEE, 1988, 10 Pages.

Nainar et al., "Layer 4 Path preference negotiation for DPS draft-arumuganainar-rtgwg-dps-14-ppn-00", Apr. 8, 2014, 11 pages.

"Transmission Control Protocol," RFC 793, Transmission Control Protocol, DARPA Internet Program Protocol Specification, Sep. 1981, 91 pp.

Katz et al., "Bidirectional Forwarding Detection (BFD)," RFC 5880, Internet Engineering Task Force (IETF), Jun. 2010, 49 pp.

Postel, "User Datagram Protocol," RFC 768, ISI, Aug. 28, 1980, 3 pp.

* cited by examiner

NETWORK DEVICE WITH SMOOTH FAILOVER OF SESSIONS

TECHNICAL FIELD

This disclosure generally relates to computer networks, and, more specifically, routing packets within computer networks.

BACKGROUND

A computer network is a collection of interconnected computing devices that can exchange data and share resources. Example computing devices include routers, switches, and other Layer 2 (L2) network devices that operate within Layer 2 of the Open Systems Interconnection (OSI) reference model, i.e., the data link layer, and Layer 3 (L3) network devices that operate within Layer 3 of the OSI reference model, i.e., the network layer. Network devices within computer networks often include a control unit that provides control plane functionality for the network device and forwarding components for routing or switching data units.

The computing devices may establish a "network session" (also referred to herein as "session") to enable communication between devices on a computer network. A session may be bidirectional in that the session includes packets traveling in both directions between a first device and a second device. For example, a session includes a forward packet flow originating from a first device and destinated for a second device and a reverse packet flow originating from the second device and destined for the first device. The forward and reverse packet flows of the session are related to one another in that the source address and source port of the forward packet flow is the same as the destination address and destination port of the reverse packet flow, and the destination address and destination port of the forward packet flow is the same as the source address and source port of the reverse packet flow. To establish a session, computing devices may use one or more communication session protocols including Transmission Control Protocol (TCP), Transport Layer Security (TLS), User Datagram Protocol (UDP), Internet Control Message Protocol (ICMP), etc.

SUMMARY

In general, the disclosure describes techniques for performing a "smooth" or gradual failover of network traffic associated with sessions and forwarded by a network device over a first link to a second link, such that the network device iteratively migrates network traffic for increasing amounts of the sessions from being forwarded via the first link to being forwarded via the second link. For example, a network device as described herein forwards network traffic of a plurality of sessions over the first link. The network device determines that a performance of the first link does not satisfy a performance requirement. In some examples, the performance requirement is specified by a Service Level agreement ("SLA") for the sessions. In some examples, the performance requirement is a performance requirement for an application or service associated with the plurality of sessions. Based at least in part on the determination, the network device forwards network traffic of a first portion of the plurality of sessions over a second link and not the first link.

The network device determines that a performance of the second link satisfies the performance requirement while carrying the network traffic of the first portion of the plurality of sessions. Based on the determination, the network device forwards network traffic of a second, larger portion of the plurality of sessions over the second link and not the first link. The network device continues to iteratively migrate a larger amount of the sessions from being forwarded via the first link to being forwarded via the second link and test the second link to ensure adherence to the performance requirement until the entirety of sessions are forwarded via the second link. In some examples, the network device may increase the proportion of sessions for which network traffic is forwarded over the second link according to a linear, logarithmic, geometric, exponential, or other algorithm. Thus, using the techniques of the disclosure, upon failure of the first link to adhere to performance requirements, a network device as described herein may iteratively migrate, from the first link to the second link, network traffic for greater and greater numbers of the sessions so as to progressively test the ability of the second link to adhere to the performance requirements with increasing amounts of network traffic, without overwhelming the second link with the migrated network traffic.

The techniques of the disclosure may provide specific improvements to the computer-related field of computer networking that have one or more practical applications. For example, the techniques of the disclosure may enhance the ability of network devices to ensure that network traffic associated with sessions is forwarded across links that adhere to performance requirements of the corresponding sessions. More particularly, the techniques of the disclosure may enable a network device as described herein to, upon failure of a first link, progressively test the capabilities of a second link with small amounts of network traffic prior to moving over the entirety of the network traffic from the first link. This may offer several advantages, for example, the network device may ensure that the second link adheres to performance requirements for progressively larger amounts of network traffic. Further, migrating a subset of the network traffic from the first link may reduce overutilization of the first link such that the first link may recover and satisfy performance requirements. Also, in conventional systems not using the techniques of the disclosure, if a network device were to migrate the entirety of the network traffic forwarded over the first link to the second link, the second link may become overutilized such that the second link fails to satisfy the performance requirements, causing "flapping" where the network device migrates network traffic from the first link, to the second link, back to the first link, and back to the second link again. Using the techniques disclosed herein, the network device may migrate only so much network traffic as the second link can handle while still meeting performance requirements, so as to avoid overutilizing the second link and mitigate the occurrence of "flapping."

In one example, this disclosure describes a network device comprising: processing circuity in communication with storage media, the processing circuity configured to: based at least in part on determining that a performance of a first link, over which network traffic of a plurality of sessions is forwarded, does not satisfy a performance requirement, forward network traffic of a first portion of the plurality of sessions over a second link and not the first link; and based at least in part on determining that a performance of the second link, over which the network traffic of the first portion of the plurality of sessions is forwarded, satisfies the performance requirement, forward network traffic of a second portion of the plurality of sessions over the second link and not the first link, wherein the second portion is greater than the first portion.

In another example, this disclosure describes a method comprising: based at least in part on determining that a performance of a first link, over which network traffic of a plurality of sessions is forwarded, does not satisfy a performance requirement, forwarding, by a network device, network traffic of a first portion of the plurality of sessions over a second link and not the first link; and based at least in part on determining that a performance of the second link, over which the network traffic of the first portion of the plurality of sessions is forwarded, satisfies the performance requirement, forwarding, by the network device, network traffic of a second portion of the plurality of sessions over the second link and not the first link, wherein the second portion is greater than the first portion.

In another example, this disclosure describes non-transitory, computer-readable media comprising instructions that, when executed, are configured to cause processing circuitry of a network device to: based at least in part on determining that a performance of a first link, over which network traffic of a plurality of sessions is forwarded, does not satisfy a performance requirement, forward network traffic of a first portion of the plurality of sessions over a second link and not the first link; and based at least in part on determining that a performance of the second link, over which the network traffic of the first portion of the plurality of sessions is forwarded, satisfies the performance requirement, forward network traffic of a second portion of the plurality of sessions over the second link and not the first link, wherein the second portion is greater than the first portion.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
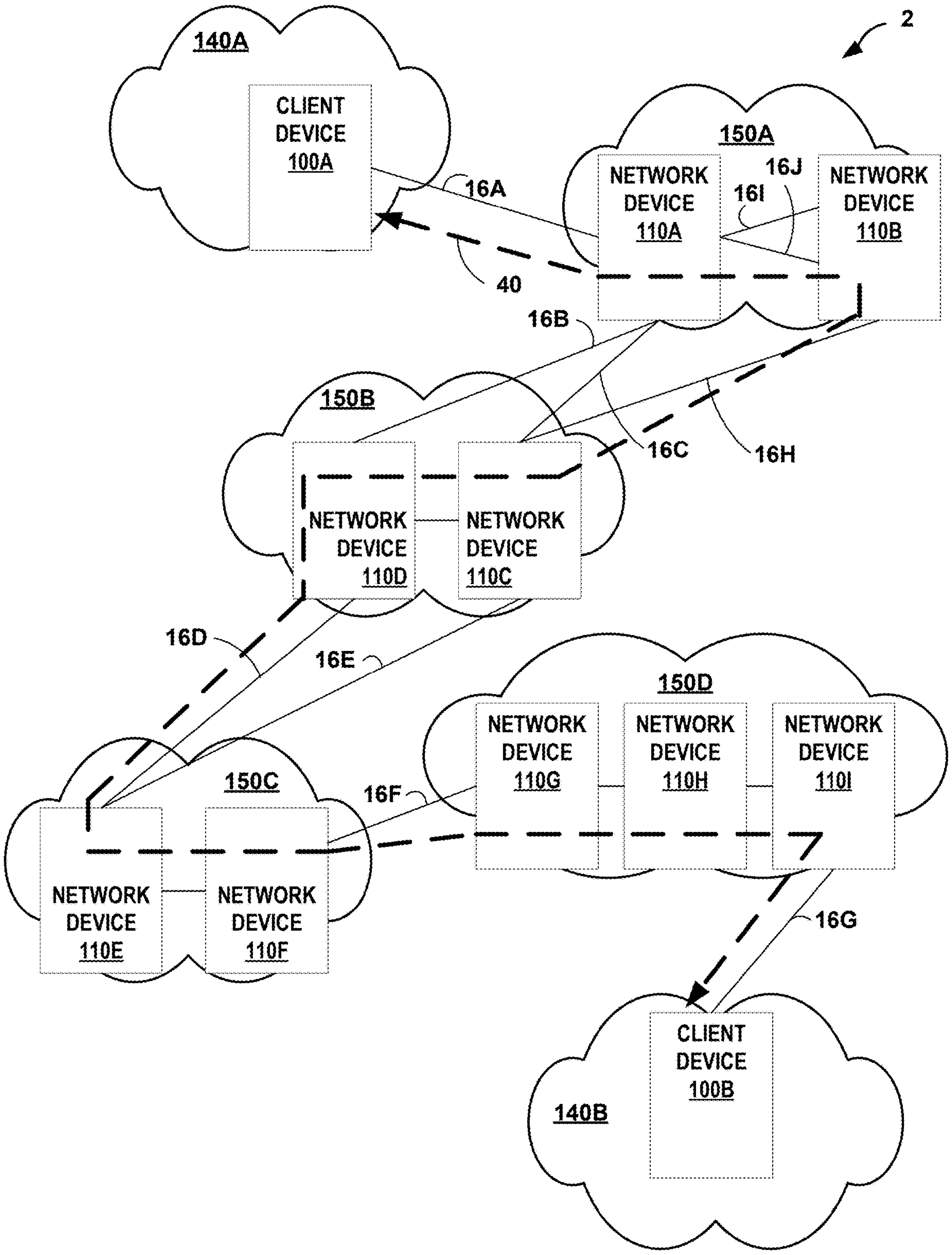
FIG. 1 is a block diagram illustrating an example computer network system in accordance with the techniques of the disclosure.

Some network devices, such as the Session-smart Router (SSR) provided by Juniper Networks, Inc., forward network traffic on a per-session basis. A session is bidirectional flow of network traffic between two client devices. If a first link along a network path between the two client devices fails (or a performance of the first link degrades such that the first link no longer meets performance requirements), a conventional network device may migrate the forwarding of network traffic for all corresponding sessions forwarded via the first link to forwarding via a second link. However, this second link may have insufficient resources to handle the network traffic of all of the migrated sessions, in addition to any preexisting traffic forwarded over the second link. Thus, the migration of the entirety of the network traffic from the first link to the second link may cause the second link to fail (or to suffer degraded performance such that the second link also no longer meets performance requirements) due to the transferred traffic overwhelming the capabilities of the second link. In some situations, this may result in "flapping" as the network device migrates traffic from use of the first link to use of the second link, and back again. For example, transferring traffic for all of the sessions may result in overwhelming the resources of the second link, causing the second link to degrade or fail performance requirements. Meanwhile, the reduction of network traffic forwarded over the first link may cause the first link to recover. The network device may thereafter migrate the traffic back to the first link, causing the first link to fail and the second link to recover for the same reasons. The network device may again migrate the traffic back to the second link, and so on, resulting in flapping between the first link and second link, as each link is unable to satisfy the demands of the network traffic of all of the migrated sessions, while the link without network traffic recovers due to the reduction of network resources.

In accordance with the techniques of the disclosure, upon determining that a first link has failed (or performance has degraded below one or more performance requirements for the sessions), a network device as described herein may migrate increasingly larger portions of network traffic of the sessions to a second link, so as to ensure that the second link can maintain adherence to performance requirements with the additional resource consumption of each portion of the migrated network traffic. In some examples, the performance requirement is specified by a Service Level agreement ("SLA") for the sessions. In some examples, the performance requirement is a performance requirement for an application or service associated with the plurality of sessions. The network device continually migrates the network traffic of greater and greater numbers of the sessions over to the second link, while monitoring compliance with performance requirements, until the network traffic for all of the sessions has been migrated from the first link to the second link.

In some examples, after migrating network traffic of a first portion of sessions, but not all of the sessions, from the first link to the second link, both the first link and the second link may be determined to satisfy performance requirements. For example, the migration of the network traffic of the first portion of sessions may be sufficient to relieve network congestion of the first link such that the performance of the first link improves enough to satisfy performance requirements. In this scenario, the network may (1) maintain the current apportionment of session traffic between the first link and the second link; (2) continue to migrate network traffic of another portion (or the entirety) of the sessions from the first link to the second link; or (3) migrate network traffic of another portion (or the entirety) of the sessions back from the second link to the first link. In some examples, this decision may be a configuration option of the network device configured by an administrator or user. Therefore, by failing over network traffic for sessions to a new link in increasing proportions, while each time migrating network traffic of the sessions and monitoring performance requirement adherence of the new link, a network device as described herein may ensure that the new link can comply with performance requirements with the increased traffic. Thus, the techniques described herein may improve the ability of a network device to ensure that links selected for the forwarding of network traffic adhere to performance requirements, as well as improve network throughput by reducing congestion of individual links.

In some examples, the network device applies an algorithm according to a logarithmic scale to determine a step-wise amount of sessions for which network traffic is migrated from the first link to the second link, so as to migrate network traffic for, e.g., 1 session, then 10 sessions, then 100 sessions, 1000 sessions, etc. After the migration of network traffic for each "step" or portion of the sessions, the network device monitors the second link's adherence to performance requirements, so as to ensure the second link is capable of supporting the increased levels of traffic without violating the performance requirements. In some examples, the network device may apply a different algorithm to determine the step-wise amount of sessions, including but not limited to a linear, polynomial, exponential, or factorial algorithm, etc.

FIG. 1 is a block diagram illustrating an example computer network system 2 in accordance with the techniques of the disclosure. In the example of FIG. 1, computer network system 2 includes service provider networks 150A-150D (collectively, "service provider networks 150") configured to provide Wide Area Network (WAN) connectivity to disparate customer networks 140A-140B (collectively, "customer networks 140"). Network devices 110A-110I (collectively, "network devices 110") of service provider networks 150 provide client devices 100A-100B (collectively, "client devices 100") associated with customer networks 140 with access to service provider networks 150. In some examples, customer networks 140 are enterprise networks. Customer network 140A is depicted as having a single client device 100A and customer network 140B is depicted as having a single client device 100B for ease of illustration, but each of customer networks 140 may include any number of client devices. Typically, customer networks 140 include many client devices 100, each of which may communicate across service provider networks 150 with one another as described in more detail below. Communication links 16A-16J (collectively, links "16") may be Ethernet, ATM or any other suitable network connections.

Network devices 110 may be implemented using any network device, such as switches, routers, gateways, or other suitable network devices that may send and receive network traffic. Customer networks 140 may be networks for geographically separated sites of an enterprise, for example. Each of customer networks 140 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers not depicted in FIG. 1. The configuration of computer network system 2 illustrated in FIG. 1 is merely an example. For example, computer network system 2 may include any number of customer networks 140. Nonetheless, for ease of description, only customer networks 140A-140B are illustrated in FIG. 1.

Service provider networks 150 represent one or more publicly accessible computer networks that are owned and operated by one or more service providers. Although computer network system 2 is illustrated in the example of FIG. 1 as including multiple interconnected service provider networks 150, in other examples computer network system 2 may alternatively include a single service provider network that provides connectivity between customer networks 140. A service provider is usually a large telecommunications entity or corporation. Each of service provider networks 150 is usually a large L3 computer network. Each service provider network 150 is an L3 network in the sense that it natively supports L3 operations as described in the OSI model. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Although not illustrated, each service provider network 150 may be coupled to one or more networks administered by other providers, and may thus form part of a large-scale public network infrastructure, e.g., the Internet. Consequently, customer networks 140 may be viewed as edge networks of the Internet. Each service provider network 150 may provide computing devices within customer networks 140, such as client devices 100, with access to the Internet, and may allow the computing devices within customer networks 140 to communicate with each other.

Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers. Moreover, although the elements of system 2 are illustrated as being directly coupled, it should be understood that one or more additional network elements may be included along any of network links 16, such that the network elements of system 2 are not directly coupled.

Each service provider network 150 typically provides a number of residential and business services for customer networks 140, including residential and business class data services (which are often referred to as "Internet services" in that these data services permit access to the collection of publicly accessible networks referred to as the Internet), residential and business class telephone and/or voice services, and residential and business class television services.

In some examples, network devices 110 may implement a stateful, session-based routing scheme that enables each network device 110 to independently perform path selection and traffic engineering. The use of session-based routing may enable network devices 110 to eschew the use of a centralized controller, such as a Software-Defined Networking (SDN) controller to perform path selection and traffic engineering. In this way, network devices 110 may be more efficient and scalable for large networks where the use of an SDN controller would be infeasible. Furthermore, the use of session-based routing may enable network devices 110 to eschew the use of tunnels, thereby saving considerable network resources by obviating the need to perform encapsulation and decapsulation at tunnel endpoints. In some examples, network devices 110 implement session-based routing as Secure Vector Routing (SVR), provided by Juniper Networks, Inc.

In the example of FIG. 1, client device 100A of system 2 establishes session 40 with client device 100B. Network devices 110 facilitate establishment of session 40 by transporting network traffic between client device 100A and client device 100B. In some examples, client device 100A may be considered a "source" device in that client device 100A originates session 40 between client device 100A and client device 100B, e.g., client device 100A is the "source" of a packet of a forward flow of the session. Session 40 includes a forward packet flow originating from client device 100A and destined for client device 100B and a reverse packet flow originating from client device 100B and destined for client device 100A. A forward flow for session 40 traverses a first path including, e.g., client device 100A, network devices 110A-110I, and client device 100B. As described in more detail below, network devices 110 enable the exchange of traffic between customer network 140A, across service provider networks 150, to customer network 140B.

Client device 100A may establish session 40 with client device 100B according to one or more L2 or L3 communication session protocols, including Ethernet, TCP, or UDP. As described in more detail below, customer network 140A may form a first network and customer network 140B may form a second network. Network devices 110 operate to extend customer network 140A across service provider networks 150 to customer network 140B. In this fashion, customer network 140A and customer network 140B may operate as if they were both part of the same network, even though customer network 140A and customer network 140B may be logically isolated and geographically separate from one another. Furthermore, network devices 110 may operate such that the existence of service provider networks 150 between customer network 140A and customer network 140B is transparent to client devices 100.

In some examples, network devices 110 may extend session 40 across service provider networks 150 according to one or more communication session protocols, including TCP or UDP, etc. For example, to establish session 40 according to TCP such that data may be exchanged according to TCP, network device 110A and network device 110B perform a three-way handshake. Network device 110A sends a first packet comprising a "SYN" flag to network device 110B. Network device 110B acknowledges receipt of the first packet by responding to network device 110A with a second packet comprising a "SYN-ACK" flag. Network device 110A acknowledges receipt of the second packet by responding to network device 110B with a third packet comprising an "ACK" flag. After sending the third packet, session 40 is established according to TCP and network devices 110A, 110B may exchange data with one another (e.g., by exchanging data packets of client device 100A and client device 100B) via session 40. Additional example information regarding TCP is described in "TRANSMISSION CONTROL PROTOCOL," Request for Comments (RFC) 793, Internet Engineering Task Force (IETF), September 1981, available at https://tools.ietf.org/html/rfc793, the entire contents of which are incorporated herein by reference.

UDP is a connectionless protocol in that network device 110A does not verify that network device 110B is capable of receiving data prior to transmitting data. To establish session 40 according to UDP, network device 110A transmits a first packet to network device 110B. Session 40 may be considered "established" according to UDP upon receipt by network device 110A of any packet from network device 110B, which implies that network device 110B successfully received the first packet from network device 110A, responded, and network device 110A was able to receive the response from network device 110B. Additional example information regarding UDP is described in "User Datagram Protocol," RFC 768, IETF, Aug. 28, 1980, available at https://tools.ietf.org/html/rfc768, the entire contents of which are incorporated herein by reference.

In the example of FIG. 1, when network device 110A receives a packet for the forward packet flow originating from client device 100A and destined for client device 100B, network device 110A determines whether the packet belongs to a new session (e.g., is the "first" packet or "lead" packet of session 40). In some examples, network device 110A determines whether a source address, source port, destination address, destination port, and protocol of the first packet matches an entry in a session table.

If no such entry exists, network device 110A determines that the packet belongs to a new session and creates an entry in the session table. Furthermore, if the packet belongs to a new session, network device 110A may generate a session identifier for session 40. The session identifier may comprise, e.g., a source address and source port of client device 100A, a destination address and destination port of client device 100B, and a protocol used by the first packet. Network device 110A may use the session identifier to identify subsequent packets as belonging to the same session.

In some examples, network devices 110 perform stateful routing for session 40. For example, network devices 110 may forward each packet of the forward packet flow of session 40 sequentially and along the same forward network path. As described herein, the "same" forward path may mean the same network devices 110 that form a segment or at least a portion between a device originating the packet and a device to which the packet is destined (and not necessarily the entire network path between the device originating the packet and the device to which the packet is destined). Further, network devices 110 forward each packet of the return flow of session 40 sequentially and along the same return network path. The forward network path for the forward packet flow of session 40 and the return network path of the return packet flow of session 40 may be the same path, or different paths. By ensuring that each packet of a flow is forwarded sequentially and along the same path, network devices 110 maintain the state of the entire flow at each network device 110, thereby enabling the use of stateful packet services, such as Deep Packet Inspection (DPI) or stateful firewall services.

In the example of FIG. 1, a stateful routing session may be established from ingress network device 110A through intermediate network devices 110B-110H to egress network device 110I. In this example, network device 110A determines that the first packet is an unmodified packet and the first packet of new session 40. Network device 110A modifies the first packet to include metadata specifying the session identifier (e.g., the original source address, source port, destination address, and destination port). Network device 110A replaces the header of the modified first packet to specify a source address that is an address of network device 110A, a source port that is a port via which network device 110A forwards the modified first packet toward client device 100B, a destination address that is an address of the next hop to which network device 110A forwards the first packet (e.g., an address of network device 110B), and a destination port that is a port of the next hop to which network device 110A forwards the first packet (e.g., a port of network device 110B).

Network device 110A may further identify a network service associated with session 40. For example, network device 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, network device 110A may determine that the forward packet flow of session 40 specifies a destination address and destination port assigned to client device 100B. Network device 110A may thereafter store an association between session 40 with the identified network service. As another example, if the source port and/or destination port for session 40 is 80, network device 110A may determine that session 40 is associated with an HTTP service. In other examples, network device 110A may determine that one or more of a source address, source port, destination address, or destination port for session 40 belong to a block of address or ports indicative that a particular service is associated with session 40.

In some examples, network device 110A uses the determined network service for session 40 to select a forward path for forwarding the first packet and each subsequent packet of the forward packet flow of session 40 toward client device 100B. In this fashion, network device 110A may perform service-specific path selection to select a network path that best suits the requirements of the service. In contrast to a network topology that uses an SDN controller to perform path selection, each network device 110 performs path selection. Further, the use of session-based routing enables each network device 110 to make routing decisions at the service- or application-level, in contrast to conventional routers that are only able to make routing decisions at the flow level.

Network device 110A forwards the modified first packet to network device 110B. Additionally, network device 110A stores the session identifier for session 40 such that, upon receiving subsequent packets for session 40, network device 110A may identify the subsequent packets as belonging to the same session 40 and forward the subsequent packets along the same path as the first packet.

Intermediate network device 110B receives the modified first packet and determines whether the modified first packet includes metadata specifying the session identifier. In response to determining that the modified first packet includes metadata specifying the session identifier, intermediate network device 110B determines that network device 110B is not an ingress device such that network device 110B does not attach metadata specifying the session identifier.

As described above with respect to network device 110A, network device 110B determines whether the packet belongs to a new session (e.g., is the “first” packet or “lead” packet of the session) by determining whether a source address, source port, destination address, destination port, and protocol of the first packet matches an entry in a session table. If no such entry exists, network device 110B determines that the packet belongs to a new session and creates an entry in the session table. Furthermore, if the packet belongs to a new session, network device 110B generates a session identifier for the session. The session identifier used by network device 110B to identify the session for the first packet may be different from the session identifier used by network device 110A to identify the same session for the first packet, because each network device 110A, 110B uses the header source address, source port, destination address, and destination port of the first packet to generate the session identifier, and this header information may be modified by each preceding network device 110 as each network device 110 forwards the first packet along the forward path. Furthermore, each network device 110 may store this header information to identify a previous network device 110 (or “waypoint”) and a next network device 110 (or “waypoint”) such that each network device 110 may reconstruct the same forward path and reverse path for each subsequent packet of the session.

Network device 110B replaces the header of the modified first packet to specify a source address that is an address of network device 110B, a source port that is a port via which network device 110B forwards the modified first packet toward client device 100B, a destination address that is an address of the next hop to which network device 110B forwards the first packet (e.g., an address of network device 110C for session 40 along the first path), and a destination port that is a port of the next hop to which network device 110B forwards the first packet (e.g., a port of network device 110C). Network device 110B forwards the modified first packet to network device 110C. Additionally, network device 110B stores the session identifier for the session such that, upon receiving subsequent packets for the session, network device 110B may identify subsequent packets as belonging to the same session and forward the subsequent packets along the same path as the first packet.

Subsequent intermediate network devices 110C-110H process the modified first packet in a similar fashion as network devices 110A and 110B such that network devices 110 forward the subsequent packets of the session along the same path as the first packet. Further, each network device 110 stores a session identifier for the session, which may include an identification of the previous network device 110 along the network path. Thus, each network device 110 may use the session identifier to forward packets of the reverse packet flow for the session along the same network path back to client device 100.

A network device 110 that may forward packets for a forward packet flow of the session to a destination for the packet flow is an egress, or “terminus” network device. In the foregoing example, network device 110I is a terminus network device because network device 110I may forward packets to client device 100B. Network device 110I receives the modified first packet that comprises the metadata specifying the session identifier (e.g., the original source address, source port, destination address, and destination port). Network device 110I identifies the modified first packet as destined for a service terminating at network device 110I by determining that the destination source address and destination source port specified in the metadata of the modified lead packet corresponds to a destination reachable by network device 110I (e.g., client device 100B). Network device 110I recovers the original first packet by removing the metadata from the modified first packet and using the metadata to modify the header of the first packet to specify the original source address, source port, destination address, and destination port. Network device 110I forwards the recovered first packet to client device 100B. The use of session-based routing may therefore form a series of waypoints (e.g., network devices 110) interconnected by path “segments” (e.g., end-to-end route vectors between each waypoint).

Additional information with respect to session-based routing and SVR is described in U.S. Pat. No. 9,729,439, entitled “COMPUTER NETWORK PACKET FLOW CONTROLLER,” and issued on Aug. 8, 2017; U.S. Pat. No. 9,729,682, entitled “NETWORK DEVICE AND METHOD FOR PROCESSING A SESSION USING A PACKET SIGNATURE,” and issued on Aug. 8, 2017; U.S. Pat. No. 9,762,485, entitled “NETWORK PACKET FLOW CONTROLLER WITH EXTENDED SESSION MANAGEMENT,” and issued on Sep. 12, 2017; U.S. Pat. No. 9,871,748, entitled “ROUTER WITH OPTIMIZED STATISTICAL FUNCTIONALITY,” and issued on Jan. 16, 2018; U.S. Pat. No. 9,985,883, entitled “NAME-BASED ROUTING SYSTEM AND METHOD,” and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, to implement session-based routing, each network device 110 maintains a local repository of service and topology state information for each other network device 110. The service and topology state information includes services reachable from each network device 110, as well as a network topology from each network device for reaching these services. Each network device 110 may transmit changes in the services reachable from the network device 110 and/or changes in the network topology for reaching the services from the network device to a central repository, e.g., a server. Further, each network device 110 may receive service and topology state information for each other network device 110 in system 2 from the central repository.

In the foregoing example, network device 110A receives a packet, determines session 40 for the forward packet flow comprising the packet, determines a service associated with session 40, and selects a network path for forwarding the packet. Network device 110A may use its local copy of the service and topology state information for each network device 110 to select the network path for forwarding the packet. For example, network device 110A may use the identified service associated with the packet and a network topology for reaching the identified service to select a network path that comports with an SLA requirement or other session performance requirements for the service. Network device 110A may then forward the packet and subsequent packets for the forward packet flow of session 40 along the selected path. In this fashion, network device 110A may perform service-specific path selection in that network device 110 may use criteria specific to the service associated with the packet to select a network path that best suits the requirements of the service.

In some examples, interfaces of network devices 110 may be assigned to one or more "neighborhoods." A "neighborhood" is defined as a label applied to an interface of a network device 110. The network devices 110 within the same neighborhood are capable of forming a peering relationship with one another. For example, each network device 110 having an interface to which a neighborhood label is applied is reachable over a Layer-3 network to each other network device 110 having an interface to which the same neighborhood label is applied. In some examples, one or more neighborhoods may be aggregated into a "district." A district is a logical grouping of one or more neighborhoods. Typically, an Autonomous System (AS) (also referred to herein as an "Authority") may be divided into one or more districts, each district including one or more neighborhoods.

In some examples, each network device 110 maintains a local repository of service and topology state information only for those other network devices 110 within the same neighborhood. In some examples, each network device 110 maintains a local repository of service and topology state information only for those other network devices 110 within the same district of neighborhoods. As an example, each service provider network 150 may be considered to be a different "district," wherein each subdomain within each service provider network 150 may be considered to be a neighborhood within that district. In this example, each network device 110A and 110B within service provider network 150A may maintain service and topology state information only for one another, and not for network devices 110C-110I. Similarly, each network device 110D and 110C within service provider network 150B may maintain service and topology state information only for one another, and not for network devices 110A-110B or 110E-110I. In other examples, an administrator may assign one or more service provider networks 150 into one or more districts, one or more neighborhoods, or a combination of districts and neighborhoods as suits the needs of network system 2.

Additional information with respect to the exchange of service and topology state information is described in U.S. Patent Application Publication No. 2020/0366590, entitled "CENTRAL AUTHORITY FOR SERVICE AND TOPOLOGY EXCHANGE," published on Nov. 19, 2020; U.S. Patent Application Publication No. 2020/0366599, entitled "SOURCE-BASED ROUTING," published on Nov. 19, 2020; U.S. Patent Application Publication No. 2020/0366598, entitled "SERVICE AND TOPOLOGY EXCHANGE PROTOCOL," published on Nov. 19, 2020; U.S. Patent Application Publication No. 2020/0366589, entitled "ROUTING USING SEGMENT-BASED METRICS," published on Nov. 19, 2020; and U.S. patent application Ser. No. 16/050,722, entitled "NETWORK NEIGHBORHOODS FOR ESTABLISHING COMMUNICATION RELATIONSHIPS BETWEEN COMMUNICATION INTERFACES IN AN ADMINISTRATIVE DOMAIN," filed on Jul. 31, 2018, the entire content of each of which is incorporated herein by reference in its entirety.

Bidirectional Forwarding Detection (BFD) is a network protocol that is used to detect faults in a bidirectional path between two network devices, such as link 16B between network devices 110A and 110B. BFD provides low-overhead, short-duration detection of failures in the link between the two network devices. Further, BFD provides a single mechanism that can be used for liveness detection over any media, at any protocol layer, with a wide range of detection times and overhead, to avoid a proliferation of different methods between adjacent devices. BFD operates on top of any data protocol (network layer, link layer, tunnels, etc.) being forwarded between two network devices. Typically, BFD operates in a unicast, point-to-point mode. BFD packets are carried as a payload of whatever encapsulating protocol is appropriate for the medium and network.

In accordance with BFD, network devices 110A and 110B establish a session over link 16B. Typically, network devices 110A and 110B establish and tear down a BFD session with a three-way handshake. Typically, network devices 110A and 110B may declare link 16B to be operational only after two-way communication is established between network devices 110A and 110B. However, this does not preclude the use of unidirectional links. For example, link 16B may represent a first unidirectional link from network device 110A to network device 11B, and a second unidirectional link from network device 110B to network device 110A.

Once the BFD session is established, network devices 110A and 110B transmit BFD packets periodically over link 16B. Each network device 110A, 110B estimates how quickly it may send and receive BFD packets so as to negotiate, with the peer network device 110A, 110B how rapidly failure detection may occur. In some examples, network devices 110A and 110B may modify, in real-time, these estimates to adapt to network congestion, changes in latency or bandwidth, or other unusual situations. This may allow for the use of a shared medium between fast network devices and slow network devices, while allowing the fast network devices to more rapidly detect failures while allowing the slow network devices to participate in failure detection.

BFD may operate in two modes: asynchronous mode and demand mode. In asynchronous mode, if one of network devices 110A and 110B stop receiving BFD packets for some amount of time (the length of which is negotiated as described above), network devices 110A and 110B may assume that link 16B (or a component, device, or path forming link 16B) has failed. In demand mode, network devices 110A and 110B may negotiate not to send periodic BFD packets in order to reduce overhead. This assumes that network devices 110A and 110B have another way to verify connectivity to one another, such as via the physical layer. However, either network device 110A, 110B may still send BFD packets if needed.

Additionally, either network device 110A, 110B may use an Echo function. When this function is active, network device 110A, e.g., sends a stream of Echo packets to network device 110B. Network device 110B responses by transmitting the Echo packets back to network device 110A via the forwarding plane of network device 110B. Network device 110A may use the Echo function to test the forwarding path of network device 110B, and vice versa. Additional example information regarding BFD is described in "Bidirectional Forwarding Detection (BFD)," RFC 5880, IETF, June 2010, available at https://datatracker.ietf.org/doc/html/rfc5880, the entire contents of which are incorporated herein by reference.

Network devices 110 create a separate BFD session for each communications path and data protocol in use between two network devices. For example, to perform fault detection along the entire path between network device 110A and 110C, a distinct BFD session may be established along each link 16, e.g., such as a first BFD session between network devices 110A and 110B along link 16B and a second BFD session between network devices 110B and 110C along link 16C.

In some examples, the use of a dedicated BFD session between two network devices may be infeasible. For example, a hub network device may be connected to a large number of spoke network devices (e.g., dozens, hundreds, or more network devices). If such a hub network device were to maintain a dedicated BFD session with each spoke network device to which the hub network device is connected, BFD packets sent and received by the hub network device may consume a large amount of network resources. Accordingly, the use of dedicated BFD sessions may consume network resources that could otherwise be used for sending and receiving customer traffic.

In some examples, to reduce the consumption of network resources used for performance monitoring, network devices 110 may use in-flow performance monitoring. For example, each network device 110 may modify packets carrying customer data for a session between client devices 100 to include metadata comprising performance metrics information. For example, a session between client device 100A and client device 100B comprises a forward flow originating from client device 100A and destined for client device 100B and a reverse flow originating from client device 100B and destined for client device 100A. Network device 110A receives, from client device 100A, a first packet of the forward flow, the first packet comprising a header and a data payload. Network device 110A modifies the first packet to further include metadata comprising first performance information and forwards the modified first packet to network device 110B. Network device 110B may obtain the first performance information from the metadata of the first packet. Further, network device 110B may remove the metadata and forward the first packet toward client device 100B (e.g., by forwarding the packet to network device 110C).

Additionally, network device 110B receives, from client device 100B, a second packet of the reverse flow, the second packet comprising a header and a data payload. Network device 110B modifies the second packet to further include metadata comprising second performance information and forwards the modified second packet to network device 110A. Network device 110A may obtain the second performance information from the metadata of the second packet. Further, network device 110A may remove the metadata and forward the second packet toward client device 100A.

In some examples, the metadata comprises a BFD packet. In some examples, the metadata comprises a timestamp that network devices 110A, 110B may use to determine performance information. In some examples, the metadata comprises a measure of network performance, such as a measure of latency, jitter, packet loss, bandwidth, etc. For example, network device 110A modifies a first packet of a forward flow to include metadata specifying a first timestamp indicative of a time at which network device 110A forwards the first packet toward network device 110B. Network device 110B modifies a second packet of a reverse flow to include metadata specifying a second timestamp indicative of a time at which network device 110B received the first packet from network device 110A and/or a third timestamp indicative of a time at which network device 110B forwards the second packet toward network device 110A. Network device 110A and 110B may exchange a plurality of such modified packets to obtain multiple datapoints regarding the performance of link 16B between network device 110A and 110B. Network device 110A, for example, may process the multiple timestamps to generate metrics for link 16B between network device 110A and 110B, such as latency, jitter, packet loss, bandwidth, etc. In this fashion, network devices 110A and 110B may conduct performance monitoring of link 16B without interrupting customer traffic between client devices 100 or consuming additional network resources through the use of dedicated BFD sessions for performance monitoring.

Additional information with respect to performance monitoring is described in U.S. Patent Application Publication No. 2020/0403890, entitled "IN-LINE PERFORMANCE MONITORING," published on Dec. 24, 2020; and U.S. Patent Application Publication No. 10,200,264, entitled "LINK STATUS MONITORING BASED ON PACKET LOSS DETECTION," issued on Feb. 5, 2019, the entire content of each of which is incorporated herein by reference in its entirety.

As described above, network devices 110 forward each packet of the forward packet flow of session 40 sequentially and along the same forward network path. Further, network devices 110 forward each packet of the reverse packet flow of session 40 sequentially and along the same reverse network path (which may or may not be the same as the forward network path). For example, as depicted in the example of FIG. 1A, network device 110A forwards network traffic for a forward packet flow for session 40 to network device 110B, which in turn forwards the network traffic for session 40 to network device 110C.

However, the path used by network devices 110 to forward traffic for session 40 may no longer be suitable due to dynamic changes in customer networks 140 or service provider network 150. The path may become unsuitable, for example, where one of links 16 or an interface of one of network devices 110 fails, where a priority of network traffic for session 40 changes, where the performance of the path over which session 40 traverses degrades or fails to meet performance requirements, or where changes in customer networks 140 make the path unsuitable for session 40 (e.g., such as due to a failure of a client gateway).

Therefore, in some examples, network devices 110 may modify the path over which mid-stream traffic for session 40 is forwarded. For example, one or more network devices 110 may select a different next-hop network device 110 to which to forward packets for session 40 or select a different ingress or egress interface with which to send or receive the packets for session 40. As described above, each network device generates a session identifier for session 40 that is based on the IP address and port of both the source network device and destination network device. Therefore, when modifying the path used by session 40, network devices 110 may use special handling procedures to ensure that the stateful nature of session 40 is not lost when migrating session 40 to the new path. In some examples, these special handling procedures may include the sharing of metadata between network devices of the old path with network devices of the new path. This metadata may include, e.g., source and destination IP address and port information of client devices 100A and 100B, respectively, as well as one or more policies, such as network, routing, or security policies, for application to the traffic between client devices 100A and 100B.

In some examples, network device 110A maintains an action chain for each flow. The action chain includes a chain descriptor which specifies a status of the flow. The action chain further includes a series of functional blocks, each functional block defining a specific function to be performed as part of routing packets associated with the flow. Network device 110 may operate according to each functional block of the action chain so as to effectuate routing of packets for the flow corresponding to the action chain. For example, a functional block of the action chain may specify a routing operation that includes an identification of, e.g., an egress interface of network device 110A, an IP address or port of network device 110A, a next-hop network device 110B, an ingress interface of network device 110B, or an IP address or port of network device 110B, etc.

Network device 110A may modify a path for session 40 so as to migrate session 40 in the following manner. Network device 110A deactivates an existing flow for session 40. To deactivate an existing flow for session 40, network device 110A modifies the chain descriptor of the action chain for a flow for session 40 to specify that the flow is invalid and/or deactivated, such that network device 110A may not use the action chain to forward subsequent packets for the flow. Next, network device 110A establishes a new flow for session 40 while the existing flow is deactivated. For example, network device 110A may define a new action chain reflecting the changes to session 40. In some examples, while establishing the new flow, network device 110A may perform special handling of packets received for the flow, such as buffering the packets, dropping the packets, forwarding the packets to a service path, etc. Network device 110A activates the new flow and forwards the received packets for session 40 via the new path for the new flow. For example, to activate the new flow, network device 110A may commence handling packets received for the flow in accordance with the new action chain reflecting the changes to the flow. Network device 110A may subsequently delete the old action chain that is now invalid and/or deactivated.

In some examples, network device 110A may not necessarily be required to notify other network devices (e.g., network devices 110B and 110C) of the change to the path and/or migration of session 40. As described above, each network device 110 generates a session identifier for session 40 that is based on the IP address and port of both the source network device and destination network device. If, for example, network device 110B receives a packet including an unknown session identifier (which may be the case for a packet for a session that is migrated mid-stream), then network device 110B may store the session identifier and perform session-based routing of the packet so as to treat the packet as a first packet of a new session.

Network devices 110 may modify a path used by the forward packet flow or the reverse packet flow for session 40 in a number of situations. For example, network device 110B may modify a packet flow when network device 110B receives, from network device 110A, a packet for the forward packet flow of session 40 on an incorrect interface of network device 110B. In this example, network device 110B may modify the forward packet flow as described above so that network device 110B receives subsequent packets for the forward packet flow from network device 110A on a correct interface.

As another example, network devices 110 may modify a packet flow in response to detecting a routing failure. A routing failure may occur, for example, if network device 110A detects a failure of link 16B, a failure of an interface of network device 110B, or a failure of network device 110B (e.g., the next-hop network device for the forward packet flow of session 40). In response, for example, network device 110A may modify the packet flow by selecting a different network device 110 (e.g., such as another hub network device not depicted in FIG. 1A) as the next-hop network device for the forward packet flow of session 40. As another example, network device 110A may modify the packet flow by selecting a different link 16 (not depicted in FIG. 1A) to network device 110B or directing the packet flow to a different ingress interface of network device 110B. In some examples, network devices 110 may use BFD to detect path failures, as described above.

As another example, network devices 110 may modify a packet flow in response to a message collision. In some examples, network devices 110 may modify the forward and reverse flows of a session so as to define routing policies based on the latest activity (e.g., received packet) received for the session. However, where a first and second network device simultaneously transmit a respective first and second packet to one another, and the first network device receives the second packet before the second network device receives the first packet, the first network device may establish a flow for the session based on the second packet. Subsequently, the second network device may receive the first packet, which may require the first network device to reestablish the flow for the session. In this example, the first network device may modify the flow as described above according to routing policies defined by the subsequently received second packet.

In some examples, network devices 110 may modify a packet flow in response to detecting additional information related to a network configuration of client devices 100. For example, network devices 110 may modify the packet flow in response to detecting the use of Source Network Address Translation (SNAT) by one or more client devices 100.

Additional information with respect to migration of sessions is described in U.S. Pat. No. 10,841,206, entitled "FLOW MODIFICATION INCLUDING SHARED CONTEXT," issued on Nov. 17, 2020; U.S. Patent Application Publication No. 2021/0036953, entitled "FLOW MODIFICATION INCLUDING SHARED CONTEXT," published on Feb. 4, 2021; U.S. Patent Application Publication No. 2021/0036953, entitled "FLOW MODIFICATION INCLUDING SHARED CONTEXT," published on Feb. 4, 2021; U.S. Pat. No. 10,257,061, entitled "DETECTING SOURCE NETWORK ADDRESS TRANSLATION IN A COMMUNICATION SYSTEM," issued on Apr. 19, 2019; U.S. Provisional Ser. No. 63/128,672, entitled "NETWORKING DEVICE AND METHOD FOR MODIFYING NETWORK LAYER PATHS IN RESPONSE TO SESSION STATE CHANGES," filed on Dec. 21, 2020; U.S. Pat. No. 10,432,519, entitled "PACKET REDIRECTING ROUTER," issued on Oct. 1, 2019; and U.S. Pat. No. 10,425,511, entitled "METHOD AND APPARATUS FOR MANAGING ROUTING DISRUPTIONS IN A COMPUTER NETWORK," issued on Sep. 24, 2019, the entire content of each of which is incorporated herein by reference in its entirety.

In accordance with the techniques of the disclosure, network device 110A may perform a "smooth" or gradual failover of network traffic associated with sessions (including session 40) and forwarded over a first link to a second link, such that network device 110A iteratively migrates network traffic for increasing amounts of the sessions from being forwarded via the first link to being forwarded via the second link. For example, network device 110A as described herein forwards network traffic of a plurality of sessions over link 16I to network device 110B. Network device 110A determines that a performance of link 16I does not satisfy a performance requirement. In some examples, the performance requirement is specified by an SLA for the sessions (or an application or service associated with the sessions). In some examples, the performance requirement is a performance requirement for an application or service associated with the plurality of sessions. Based at least in part on the determination, network device 110A forwards network traffic of a first portion of the plurality of sessions over link 16J and not link 16I.

Network device 110A determines that a performance of link 16J satisfies the performance requirement while carrying the network traffic of the first portion of the plurality of sessions. Based on the determination, network device 110A forwards network traffic of a second, larger portion of the plurality of sessions over link 16J and not link 16I. Network device 110A continues to iteratively migrate a larger amount of the sessions from being forwarded via link 16I to being forwarded via link 16J and test link 16J to ensure adherence to the performance requirement until network traffic for the entirety of sessions are forwarded via link 16J. In some examples, network device 110A may increase the proportion of sessions for which network traffic is forwarded over link 16J according to a linear, logarithmic, geometric, exponential, or other algorithm. Thus, using the techniques of the disclosure, upon failure of link 16I to adhere to performance requirements, network device 110A may iteratively migrate, from link 16I to link 16J, network traffic for greater and greater numbers of the sessions so as to progressively test the ability of link 16J to adhere to the performance requirements with increasing amounts of network traffic, without overwhelming link 16J with the migrated network traffic.

In the example of FIG. 1, network device 110A migrates network traffic for the sessions from link 16I to link 16J, both of which connect network device 110A to network device 110B. However, in other examples, links 16 may be connected to the same or different network device, such as two links both of which being connected to network device 110B (as depicted in FIG. 1), or two links connected to different network devices (e.g., such as links 16I and 16C, connected to network devices 110B, 110C, respectively) (not depicted in the example of FIG. 1).

Figure 2:
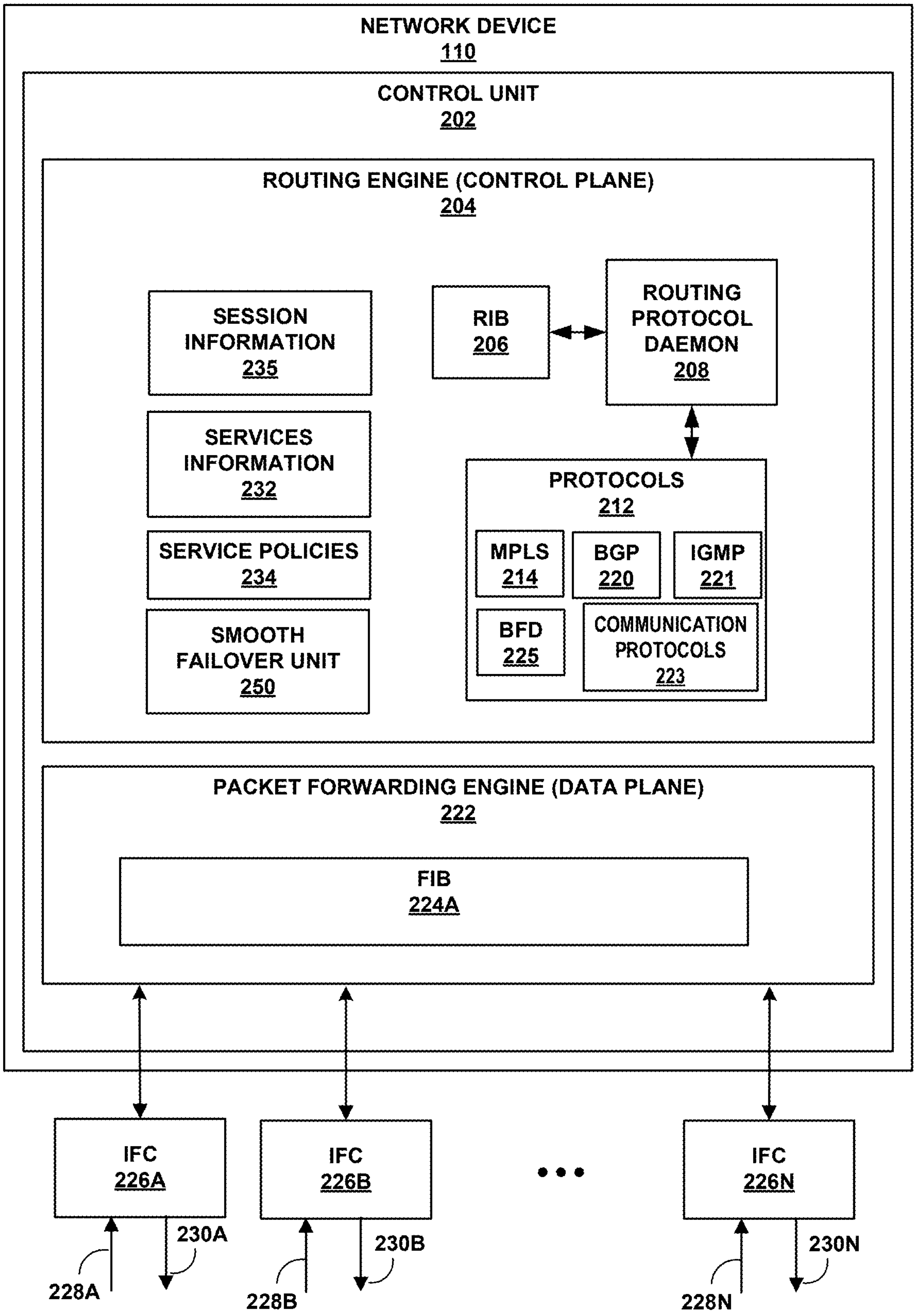
FIG. 2 is a block diagram illustrating an example network device in accordance with the techniques of the disclosure.

FIG. 2 is a block diagram illustrating an example network device 110 in accordance with the techniques of the disclosure. In general, network device 110 may be an example of one of network devices 110 of FIG. 1. In this example, network device 110 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. Network device 110 also includes a control unit 202 that determines routes of received packets and forwards the packets accordingly via IFCs 226.

Control unit 202 may comprise routing engine 204 and packet forwarding engine 222. Routing engine 204 operates as the control plane for network device 110 and includes an operating system that provides a multi-tasking operating environment for execution of a number of concurrent processes. Routing engine 204 communicates with other network devices, e.g., such as network devices 110 of FIG. 1, to establish and maintain a computer network, such as computer network system 2 of FIG. 1, for transporting network traffic between one or more customer devices. Routing protocol daemon (RPD) 208 of routing engine 204 executes software instructions to implement one or more control plane networking protocols 212. For example, protocols 212 may include one or more routing protocols, such as Internet Group Management Protocol (IGMP) 221 and/or Border Gateway Protocol (BGP) 220, for exchanging routing information with other routing devices and for updating routing information base (RIB) 206, Multiprotocol Label Switching (MPLS) protocol 214, BFD protocol 225, and other routing protocols. Protocols 212 may further include one or more communication session protocols, such as TCP, UDP, TLS, or ICMP.

RIB 206 may describe a topology of the computer network in which network device 110 resides, and may also include routes through the shared trees in the computer network. RIB 206 describes various routes within the computer network, and the appropriate next hops for each route, i.e., the neighboring routing devices along each of the routes. Routing engine 204 analyzes information stored in RIB 206 and generates forwarding information for forwarding engine 222, stored in Forwarding information base (FIB) 224. FIB 224 may associate, for example, network destinations with specific next hops and corresponding IFCs 226 and physical output ports for output links 230. FIB 224 may be a radix tree programmed into dedicated forwarding chips, a series of tables, a complex database, a link list, a radix tree, a database, a flat file, or various other data structures.

FIB 224 may also include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward flow and/or a reverse flow of the session. As described above, when routing engine 204 receives a packet for a forward packet flow originating from client device 100A and destined for client device 100B of FIG. 1, routing engine 204 determines whether the packet belongs to a new session (e.g., is the "first" packet or "lead" packet of session 40). To determine whether the packet belongs to a new session, routing engine 204 determines whether session information 235 includes an entry corresponding to a source address, source port, destination address, destination port, and protocol of the first packet. If an entry exists, then the session is not a new session. If no entry exists, then the session is new and routing engine 204 generates a session identifier for the session and stores the session identifier in session information 235. Routing engine 204 may thereafter use the session identifier stored in session information 235 for the session to identify subsequent packets as belonging to the same session.

Services information 232 stores information that routing engine 204 may use to identify a service associated with a session. In some examples, services information 232 is in the form of a services table. For example, services information 232 comprises one or more entries that specify a service identifier and one or more of a source address, source port, destination address, destination port, or protocol associated the service. In some examples, routing engine 204 may query services information 232 with one or more of a source address, source port, destination address, destination port, or protocol of a session for a received packet to determine a service associated with a session. For example, routing engine 204 may determine a service identifier based on a correspondence of a source address, source port, destination address, destination port, or protocol in services information 232 to a source address, source port, destination address, destination port, or protocol specified by a session identifier. Routing engine 204 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing engine 204 applies, to the packet, the one or more service policies 234 that correspond to the service associated with the packet.

In accordance with the techniques of the disclosure, routing engine 204 of network device 110 incudes smooth failover unit 250, which performs a "smooth" or gradual failover of network traffic associated with sessions and forwarded over a first link to a second link, such that network device 110 iteratively migrates network traffic for increasing amounts of the sessions from being forwarded via the first link to being forwarded via the second link. Network device 110 may operate as any of network devices 110 of FIG. 1.

For example, packet forwarding engine 222 forwards network traffic of a plurality of sessions over outbound link 230A. Smooth failover unit 250 determines that a performance of outbound link 230A does not satisfy a performance requirement. In some examples, the performance requirement is specified by an SLA for the sessions (or an application or service associated with the sessions). In some examples, the performance requirement is a performance requirement for an application or service associated with the plurality of sessions. In some examples, the one or more performance requirements comprise a session-specific requirement for one or more of a bandwidth for network traffic of each session, a latency for network traffic of each session, or a jitter for network traffic of each session. In some examples, the performance requirement for the sessions is an SLA requirement for the sessions (or for an application or service corresponding to one or more of the sessions). In some examples, the performance requirement is a performance requirement for an application or service associated with the plurality of sessions. In some examples, smooth failover unit 250 may determine compliance of outbound link 230A using the techniques for in-flow performance monitoring using BFD as discussed above. For example, smooth failover unit 250 may establish a BFD session with another network device 110 across outbound link 230A to determine the performance of outbound link 230A. in some examples, smooth failover unit 250 may modify packets of the network traffic of one or more of the sessions to include metadata specifying performance metrics information.

Based at least in part on the determination, smooth failover unit 250 configures packet forwarding engine 222 to forward network traffic of a first portion of the plurality of sessions over outbound link 230B and not outbound link 230A. Packet forwarding engine 222 forwards network traffic associated with the first portion of the plurality of sessions over outbound link 230B, and the network traffic for the remainder of the plurality of sessions over outbound link 230A.

Smooth failover unit 250 determines that a performance of outbound link 230B satisfies the performance requirement while carrying the network traffic of the first portion of the plurality of sessions. Based on the determination, smooth failover unit 250 configures packet forwarding engine 222 to forward network traffic of a second, larger portion of the plurality of sessions over outbound link 230B and not outbound link 230A. Packet forwarding engine 222 forwards network traffic associated with the second portion of the plurality of sessions over outbound link 230B, and the network traffic for the remainder of the plurality of sessions over outbound link 230A.

In some examples, the network traffic of the second portion of the plurality of sessions represents an increase over the first portion of the plurality of sessions that is logarithmic, linear, polynomial, exponential, or factorial, etc. For example, the network device may migrate a number of sessions according to a logarithmic algorithm $y(n)=x*\log(n)$, wherein y is the number of sessions to be migrated the second link, n is an integer denoting the iteration count, and x is a scalar constant. As another example, the network device may migrate a number of sessions according to a linear algorithm $y(n)=x*n$, wherein y is the number of sessions to be migrated the second link, n is an integer denoting the iteration count, and x is a scalar constant. As another example, the network device may migrate a number of sessions according to a polynomial algorithm $y(n)=x^n$, wherein y is the number of sessions to be migrated to the second link, n is an integer denoting the iteration count, and x is a scalar constant. As another example, the network device may migrate a number of sessions according to an exponential algorithm $y(n)=x*n^n$, wherein y is the number of sessions to be migrated to the second link, n is an integer denoting the iteration count, and x is a scalar constant. As another example, the network device may migrate a number of sessions according to a factorial algorithm y(n)=x*n!, wherein y is the number of sessions to be migrated to the second link, n is an integer denoting the iteration count, and x is a scalar constant.

Smooth failover unit 250 continues to iteratively migrate a larger amount of the sessions from being forwarded via outbound link 230A to being forwarded via outbound link 230A, and test the performance of outbound link 230B to ensure adherence to the performance requirement, until network traffic for the entirety of sessions are forwarded via outbound link 230B. For example, smooth failover unit 250 determines that a third performance of outbound link 230B satisfies the performance requirement while carrying the network traffic of the second portion of the plurality of sessions. Based on the determination, smooth failover unit 250 configures packet forwarding engine 222 to forward network traffic of a third portion of the plurality of sessions over outbound link 230B and not outbound link 230A, the third portion being larger than the second portion. Packet forwarding engine 222 forwards network traffic associated with the third portion of the plurality of sessions over outbound link 230B, and the network traffic for the remainder of the plurality of sessions over outbound link 230A. In some examples, smooth failover unit 250 iteratively increases the proportion of sessions for which network traffic is forwarded over outbound link 230B for each step-wise increase of network traffic, according to a linear, logarithmic, geometric, exponential, or other algorithm, as described above, based at least in part on determining that outbound link 230B is capable of satisfying the performance requirements after the previous step-wise increment of network traffic.

In the foregoing example, the performance requirement is associated with a network performance of outbound link 230B, which may be determined, e.g., by monitoring a bandwidth, latency, or jitter of outbound link 230B. However, in other examples, the performance requirement is a performance requirement for an application or service associated with the plurality of sessions. For example, it may be the case that outbound link 230B, to which the network traffic for the plurality of sessions is being migrated, may meet a particular SLA requirement, such as an SLA requirement for bandwidth, latency, or jitter, etc. However, performance of an application or service associated with the plurality of sessions may suffer due to transparent reasons, such as unnecessary fragmentation due to maximum transmission unit (MTU) sizing issues, Differentiated Services Code Point (DSCP) rewriting, etc. The techniques of the disclosure contemplate the evaluation of the performance of outbound link 230B itself, as well as the evaluation of the performance of an application or service associated with the associated with the plurality of sessions, when determining whether outbound link 230B can adhere to the performance requirements for network traffic of small portions of the sessions, prior to migrating network traffic for larger and larger numbers of the sessions.

Thus, using the techniques of the disclosure, upon failure of outbound link 230A to adhere to performance requirements, smooth failover unit 250 may iteratively migrate, from outbound link 230A to outbound link 230B, network traffic for greater and greater numbers of the sessions so as to progressively test the ability of outbound link 230B to adhere to the performance requirements with increasing amounts of network traffic, without overwhelming outbound link 230B with the migrated network traffic.

In some situations, smooth failover unit 250 may determine that outbound link 230B fails the performance requirements after network traffic for a portion of the plurality of sessions is migrated to outbound link 230B. For example, the network traffic of the second portion of the plurality of sessions may exceed or exhaust resources of outbound link 230B, causing failure of outbound link 230B or degradation of performance of outbound link 230B. In this situation, smooth failover unit 250 may revert to the forwarding of network traffic for only a previous portion of the plurality of sessions for which outbound link 230B was determined to be able to satisfy the performance requirements (e.g., with respect to the previous example, revert to using outbound link 230B for only the first portion of the plurality of sessions). Upon such a determination that outbound link 230B is unable to satisfy the performance requirements for network traffic of additional sessions, smooth failover unit 250 may optionally keep network traffic for the plurality of sessions on the original link (e.g., outbound link 230A), or select a new link to use in conjunction with (or in the alternative to) the use of outbound link 230A and outbound link 230B (e.g., such as selecting the use of outbound link 230C, etc.).

Thus, using the techniques of the disclosure, upon failure of outbound link 230A to adhere to performance requirements, smooth failover unit 250 may iteratively migrate, from outbound link 230A to outbound link 230B, network traffic for greater and greater numbers of the sessions so as to progressively test the ability of outbound link 230B to adhere to the performance requirements with increasing amounts of network traffic, without overwhelming outbound link 230B with the migrated network traffic.

In some examples, after migrating network traffic of some of the sessions from outbound link 230A to outbound link 230B, but not all of the sessions, smooth failover unit 250 may determine that both outbound link 230A to outbound link 230B satisfy the performance requirements. For example, the migration of the network traffic of, e.g., the first portion of sessions may be sufficient to relieve network congestion of outbound link 230A such that the performance of outbound link 230A improves enough to satisfy the performance requirements. In this scenario, smooth failover unit 250 may proceed in a number of ways: (1) smooth failover unit 250 may continue to migrate network traffic of another portion (or the entirety) of the sessions from outbound link 230A to outbound link 230B; (2) smooth failover unit 250 may maintain the current apportionment of session traffic between outbound link 230A and outbound link 230B; or (3) smooth failover unit 250 may migrate network traffic of another portion (or the entirety) of the sessions back from outbound link 230B to outbound link 230A. The particular option may be a configuration option set by a user, such as a network administrator.

For example, after configuring packet forwarding engine 222 to forward network traffic of the second portion of the plurality of sessions over outbound link 230B and not outbound link 230A, smooth failover unit 250 determines that the performance of outbound link 230A has resumed satisfying the performance requirement. Nevertheless, smooth failover unit 250 configures packet forwarding engine 222 to forward network traffic of a third portion of the plurality of sessions over outbound link 230B and not outbound link 230A, the third portion being larger than the second portion, despite determining that the performance of outbound link 230A has resumed satisfying the performance requirement.

As another example, after configuring packet forwarding engine 222 to forward network traffic of the second portion of the plurality of sessions over outbound link 230B and not outbound link 230A, smooth failover unit 250 determines that the performance of outbound link 230A has resumed satisfying the performance requirement. In this example, smooth failover unit 250 maintains an apportionment of network traffic of the plurality of sessions between outbound link 230A and outbound link 230B.

As another example, after configuring packet forwarding engine 222 to forward network traffic of the second portion of the plurality of sessions over outbound link 230B and not outbound link 230A, smooth failover unit 250 determines that the performance of outbound link 230A has resumed satisfying the performance requirement. In this example, smooth failover unit 250 configures packet forwarding engine 222 to return to the forwarding of network traffic of another portion (or the entirety) of the sessions over outbound link 230A and not outbound link 230B.

Therefore, by failing over network traffic for sessions to outbound link 230B in increasing proportions, while each time monitoring performance requirement adherence of outbound link 230B, smooth failover unit 250, operating as described herein, may ensure that the outbound link 230B can comply with performance requirements with the increased traffic. Thus, the techniques described herein may improve the ability of a network device to ensure that links selected for the forwarding of network traffic adhere to performance requirements, as well as improve network throughput by reducing congestion of individual links.

Figure 3:
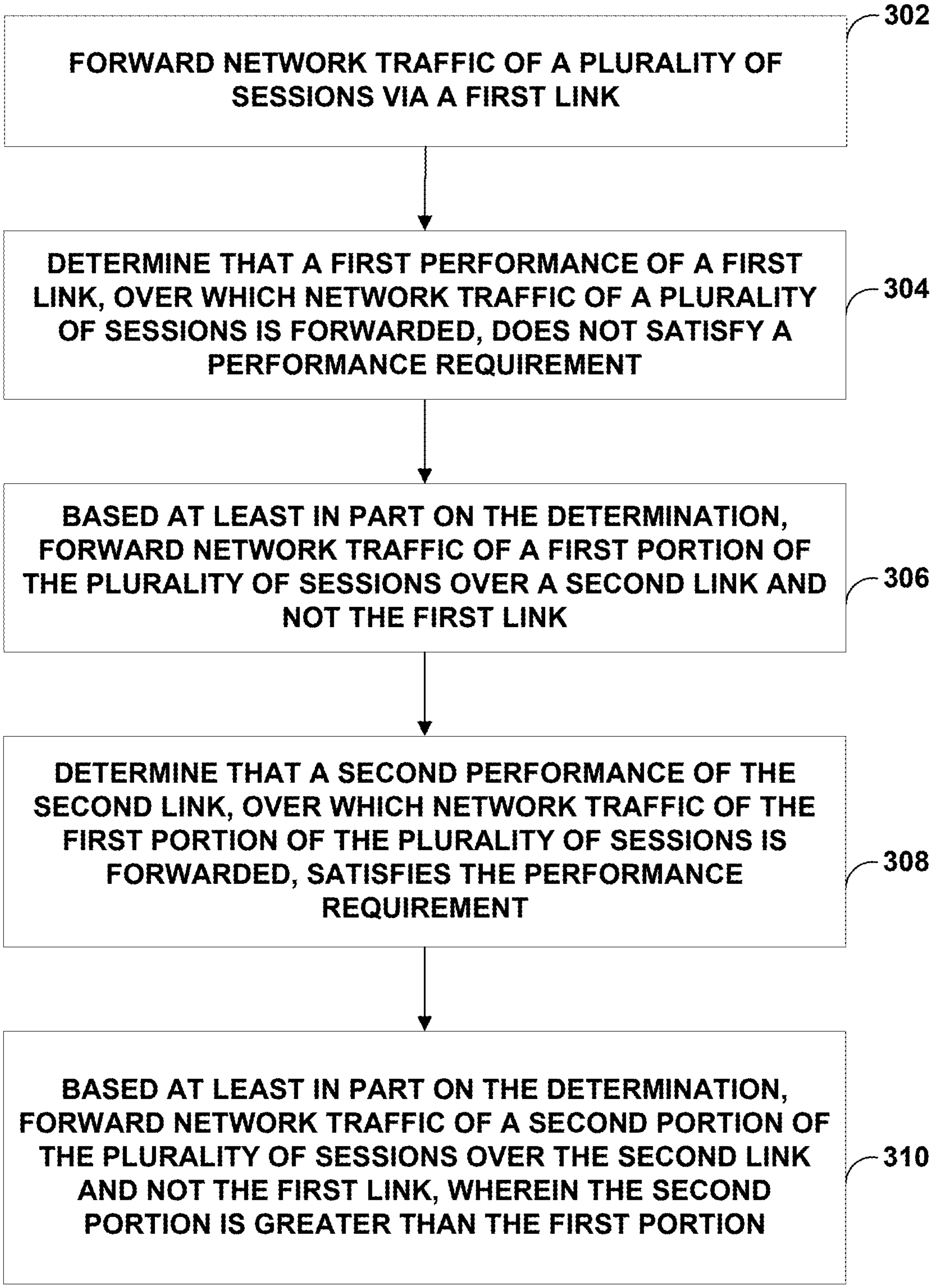
FIG. 3 is a flowchart illustrating an example operation in accordance with the techniques of the disclosure.

FIG. 3 is a flowchart illustrating an example operation in accordance with the techniques of the disclosure. FIG. 3 is described with respect to FIG. 1 for convenience.

As depicted in the example of FIG. 3, network device 110A forwards network traffic of a plurality of sessions via first link 16I (302). Network device 110A determine that a performance of first link 16I, over which network traffic of the plurality of sessions is forwarded, does not satisfy a performance requirement (304). In some examples, the performance requirement is specified by an SLA for the sessions (or an application or service associated with the sessions). In some examples, the performance requirement is a performance requirement for an application or service associated with the plurality of sessions. Based at least in part on the determination, network device 110A forwards network traffic of a first portion of the plurality of sessions over second link 16J and not first link 16I (306).

Network device 110A determines that a performance of second link 16J, over which network traffic of the first portion of the plurality of sessions is forwarded, satisfies the performance requirement (308). Based at least in part on the determination, network device 110A forwards network traffic of a second portion of the plurality of sessions over second link 16J and not first link 16I, wherein the second portion is greater than the first portion (310). In some examples, network device 110A may increase the proportion of sessions for which network traffic is forwarded over link 16I according to a linear, logarithmic, geometric, exponential, or other algorithm. Network device 110A may iteratively perform steps 308 and 310, each time increasing the number of sessions for which associated network traffic is forwarded over second link 16J and not first link 16I, until network traffic for the entirety of sessions are forwarded over second link 16J and not first link 16I, or alternatively, until the performance of second link 16J fails to satisfy the performance requirements, at which point network device 110A may revert to the forwarding of network traffic of a previous amount of sessions for which second link 16J was determined to be able to satisfy the performance requirement.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A network device comprising:

processing circuitry; and storage media comprising instructions executable by the processing circuitry to cause the network device to:

based at least in part on determining that a performance of a first link, over which network traffic of a plurality of sessions is forwarded, does not satisfy a performance requirement, forward network traffic of a first portion of the plurality of sessions over a second link and not the first link; and based at least in part on determining that a performance of the second link, over which the network traffic of the first portion of the plurality of sessions is forwarded, satisfies the performance requirement, forward network traffic of a second portion of the plurality of sessions over the second link and not the first link, wherein the second portion is greater than the first portion, wherein the network traffic of the second portion represents at least one of a logarithmic increase, a polynomial increase, or an exponential increase from the network traffic of the first portion.

2. The network device of claim 1, wherein the instructions further cause the network device to:

based at least in part on determining that the performance of the second link, over which the network traffic of the first portion and the second portion of the plurality of sessions is forwarded, satisfies the performance requirement, forward network traffic of a third portion of the plurality of sessions over the second link and not the first link, wherein the third portion is greater than the second portion.

3. The network device of claim 2, wherein the instructions cause the network device to forward network traffic of the third portion of the plurality of sessions over the second link and not the first link despite determining that the performance of the first link has resumed satisfying the performance requirement.

4. The network device of claim 1, wherein the instructions further cause the network device to:

after forwarding network traffic of the second portion of the plurality of sessions over the second link and not the first link, and based at least in part on determining that the performance of the first link has resumed satisfying the performance requirement, maintain an apportionment of network traffic of the plurality of sessions between the first link and the second link.

5. The network device of claim 1, wherein the instructions further cause the network device to:

after forwarding network traffic of the second portion of the plurality of sessions over the second link and not the first link, and based at least in part on determining that the performance of the first link has resumed satisfying the performance requirement, forward network traffic of all of the plurality of sessions over the first link and not the second link.

6. The network device of claim 1, wherein the instructions cause the network device to determine the performance of the first link by modifying network traffic of the plurality of sessions to include metadata specifying performance metrics information.

7. The network device of claim 1, wherein the instructions cause the network device to determine the performance of the first link by establishing a Bidirectional Forwarding Detection (BFD) session across the first link.

8. A method comprising:

based at least in part on determining that a performance of a first link, over which network traffic of a plurality of sessions is forwarded, does not satisfy a performance requirement, forwarding, by a network device, network traffic of a first portion of the plurality of sessions over a second link and not the first link; and based at least in part on determining that a performance of the second link, over which the network traffic of the first portion of the plurality of sessions is forwarded, satisfies the performance requirement, forwarding, by the network device, network traffic of a second portion of the plurality of sessions over the second link and not the first link, wherein the second portion is greater than the first portion, wherein the network traffic of the second portion represents at least one of a logarithmic increase, a polynomial increase, or an exponential increase from the network traffic of the first portion.

9. The method of claim 8, further comprising:

based at least in part on determining that the performance of the second link, over which the network traffic of the first portion and the second portion of the plurality of sessions is forwarded, satisfies the performance requirement, forwarding, by the network device, network traffic of a third portion of the plurality of sessions over the second link and not the first link, wherein the third portion is greater than the second portion.

10. The method of claim 9, wherein forwarding network traffic of the third portion of the plurality of sessions over the second link and not the first link is despite determining, by the network device, that the performance of the first link has resumed satisfying the performance requirement.

11. The method of claim 8, further comprising:

after forwarding network traffic of the second portion of the plurality of sessions over the second link and not the first link, and based at least in part on determining that the performance of the first link has resumed satisfying the performance requirement, maintaining, by the network device, an apportionment of network traffic of the plurality of sessions between the first link and the second link.

12. The method of claim 8, further comprising:

after forwarding network traffic of the second portion of the plurality of sessions over the second link and not the first link, and based at least in part on determining that the performance of the first link has resumed satisfying the performance requirement, forwarding, by the network device, network traffic of all of the plurality of sessions over the first link and not the second link.

13. The method of claim 8, wherein determining the performance of the first link comprises modifying network traffic of the plurality of sessions to include metadata specifying performance metrics information.

14. Non-transitory, computer-readable media comprising instructions executable by processing circuitry to cause a network device to:

based at least in part on determining that a performance of a first link, over which network traffic of a plurality of sessions is forwarded, does not satisfy a performance requirement, forward network traffic of a first portion of the plurality of sessions over a second link and not the first link; and based at least in part on determining that a performance of the second link, over which the network traffic of the first portion of the plurality of sessions is forwarded, satisfies the performance requirement, forward network traffic of a second portion of the plurality of sessions over the second link and not the first link, wherein the second portion is greater than the first portion, wherein the network traffic of the second portion represents at least one of a logarithmic increase, a polynomial increase, or an exponential increase from the network traffic of the first portion.

* * * * *